United States Patent
Edwards

[11] 3,882,212
[45] May 6, 1975

[54] PROCESS FOR FORMING THIN WALLED PLASTIC ARTICLES

[75] Inventor: Bryant Edwards, Clarendon Hills, Ill.

[73] Assignee: Illinois Tool Works Inc., Chicago, Ill.

[22] Filed: Sept. 24, 1973

[21] Appl. No.: 400,104

Related U.S. Application Data

[63] Continuation-in-part of Ser. No. 214,275, Dec. 30, 1971, abandoned.

[52] U.S. Cl. .......... 264/94; 264/97; 425/DIG. 209; 425/DIG. 233
[51] Int. Cl. ............................................ B29c 17/07
[58] Field of Search ............. 264/89, 90, 92, 94, 97, 264/296, 328, 294; 425/242 B, 324 B, 326 B, 387 B, DIG. 209, DIG. 214, DIG. 233

[56] References Cited
UNITED STATES PATENTS

| | | |
|---|---|---|
| 3,349,155 | 10/1967 | Valyi .................................. 264/97 |
| 3,397,266 | 8/1968 | Ayres ................................ 264/328 |
| 3,412,186 | 11/1968 | Piotrowski ........................ 264/97 X |
| 3,680,763 | 8/1972 | Ludder ............................. 229/1.5 B |
| 3,770,860 | 11/1973 | Amberg et al. ...................... 264/89 |

*Primary Examiner*—Jan H. Silbaugh
*Attorney, Agent, or Firm*—Robert C. Beart; Edward L. Benno

[57] ABSTRACT

The process for use in the injection-blow molding of relatively thin walled thermoplastic articles with accurately controlled wall thicknesses. A preform is injection molded using a deflectable mandrel by stabilizing the mandrel during injection molding through flow of material through the mold cavity. The preform is then positioned within a blow mold such that its end is trapped adjacent the bottom of the blow mold between the mold bottom and mandrel on which it is positioned and the preform is blown within the mold progressively from the sidewalls to the end. Also, the sub-process for use in the blow molding of certain nestable thermoplastic preforms into non-nestable relatively thin walled containers. The preforms are trapped and blown using the technique previously indicated.

4 Claims, 7 Drawing Figures

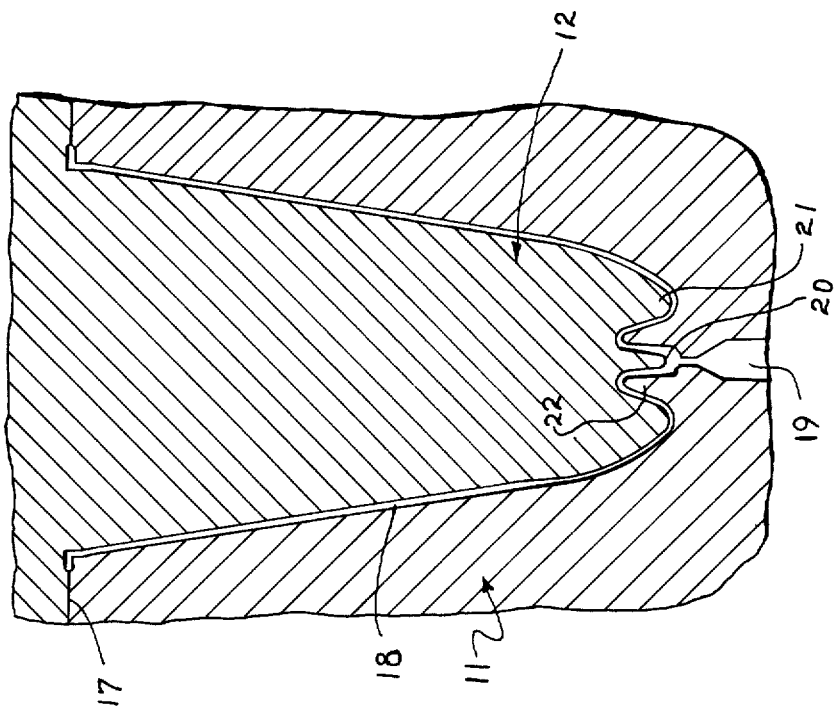
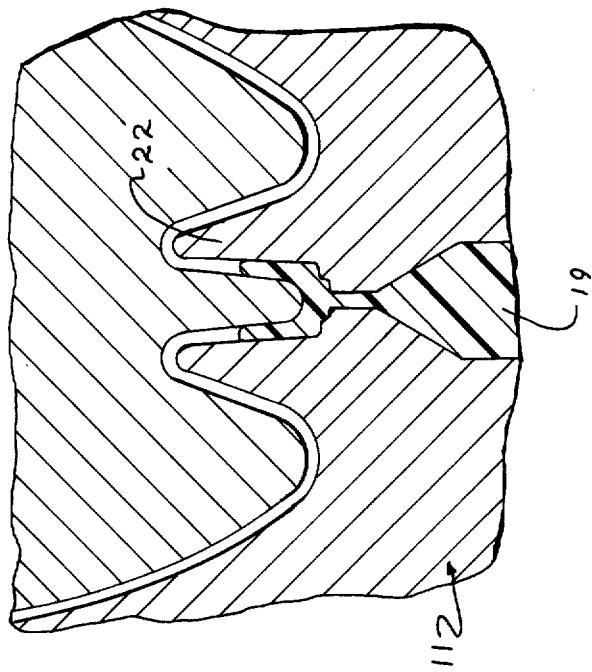
FIG. 2
FIG. 3

PROCESS FOR FORMING THIN WALLED PLASTIC ARTICLES

This application is a continuation-in-part of application Ser. No. 214,275, filed Dec. 30, 1971, now abandoned.

BACKGROUND OF THE INVENTION

The process of the invention is intended for use in the field of injection-blow molding of thermoplastic articles, and comprises methods for forming thermoplastic articles with accurately controlled wall thicknesses. The process of the invention finds particular application in the production of relatively thin walled thermoplastic articles where wall thickness dimensions are extremely important. The invention further includes the sub-process for blow molding certain nestable thermoplastic preforms into non-nestable relatively thin walled containers with accurately controlled wall thicknesses.

In the injection molding art wherein the male mold is subject to deflection by an unbalanced flow of the molten thermoplastic material injected into the mold cavity under relatively high pressures, defective articles are commonly produced. Injection molding of thermoplastic articles is substantially improved through the use of the process and apparatus of my co-pending applications, Ser. No. 308,200, filed Nov. 20, 1972, now U.S. Pat. No. 3,820,931, and Ser. No. 371,652, filed June 19, 1973, now U.S. Pat. No. 3,829,548, the subject matter of which is incorporated by reference herein.

In the blow molding of thermoplastic preforms through the use of blow molding equipment, it has often been found that improper wall thicknesses result when the preform is blown to the desired reform configuration. Such containers are often designed with a wall thickness of about 0.008 to 0.013 inches and in known injection-blow molding equipment or in known blow molding equipment using preforms, the preform will often shift on the male mold or mandrel during blowing and this will cause the formation of defective containers with holes through a side wall or with an excessively thin wall at one portion with an excessively thick wall at another portion of the container.

The processes of the subject invention lend themselves ideally to the manufacture of disposable thin walled thermoplastic cups or containers. In blow molding such containers use is made of thermoplastic preforms such as shown in my co-pending application, Ser. No. 214,275, filed Dec. 30, 1971, now abandoned, the subject matter of which is incorporated by reference herein.

SUMMARY OF THE INVENTION

The present invention overcomes the above described serious problems in the prior art injection-blow molding or blow molding of preforms into relatively thin walled hollow thermoplastic articles such as cups or containers. In reductions to practice of the invention, the completely unexpected result of plastic articles with extremely accurately controlled wall thicknesses has been found. In one such reduction to practice the blown container had an average wall thickness of about 0.010 inches with less than a 20 percent variance in thickness thereabout. The thermoplastic material used was high impact polystyrene. Other thermoplastic materials, such as, high density polyethylene and polypropylene may also be used. In that reduction to practice the average wall thickness of the preform was 0.020 inches, with less than a 5 percent variance in wall thickness thereabout. In the injection molding of the preform, the thermoplastic material was injected at a pressure of 20,000 p.s.i. and was at a temperature of about 550° Fahrenheit. In the blowing of the article the preform was at a temperature of about 260° Fahrenheit and the air pressure for the blowing operation was about 100 p.s.i. It is intended that as used hereinafter, the term plastic is a thermoplastic material having suitable physical properties such as those of high density polyethylene or high impact polystyrene.

As applied to the field of injection-blow molding, the unique process of the subject invention involves the injection under high pressure of a molten thermoplastic material through the female mold into the mold cavity and circumferentially about a small confined area adjacent to the injection molding nozzle and including a small circumferential portion of the male mold part to effectively lock the male and female mold parts from relative shifting as molten plastic is further forced into the remaining larger parts of the mold cavity. The invention further contemplates the transfer of the preformed article on the male mold to a female blow mold for blowing of the preformed article into the article. In the latter steps and apparatus, the male mold with the preformed article thereon is positioned in the female blow mold so that the small confined area previously adjacent to the injection molding nozzle is spaced from but immediately adjacent to a wall of the female blow mold whereby the preform is prevented from shifting about the surface of the male mold as the preformed article is blown into the article. In the blowing process the flow or movement of the thermoplastic material from the male mold progresses from the upper side wall of the article downwardly toward the closed end thereof with the unfolding or expansion of the closed end of the preform being the last movement or flow.

As applied to the field of blow molding of a preform, the preform is made with a small annular section, the axis of which generally coincides with the longitudinal axis of the article and on the inner side thereof. A mandrel is provided with the internal shape of the preform and includes a pin on the end thereof which will extend into the annular section within the preform. The mandrel is placed in a female blow mold with the end of the mandrel having the pin positioned spaced from but closely adjacent to a wall of the female mold. Upon blowing the preform into the reformed article by differential air pressure, the preform is prevented from shifting relative to the mandrel by virtue of the confinement of the annular section of the preform about the pin of the mandrel and the resulting reformed article will have the desired shape and wall thickness.

The primary object of the invention is to provide a process for injection-blow molding or blow molding of preforms to produce relatively thin walled hollow plastic articles with accurately controlled wall thicknesses.

Other objects and features of the invention will be apparent upon a perusal of the hereinafter following specification and drawings.

BRIEF DESCRIPTION OF THE DRAWINGS

FIG. 2 is a fragmentary cross-sectional view of an injection mold constructed according to the invention;

FIG. 3 is an enlarged fragmentary view of the structure shown in FIG. 2;

DETAILED DESCRIPTION OF THE PREFERRED EMBODIMENT

Figure 1:
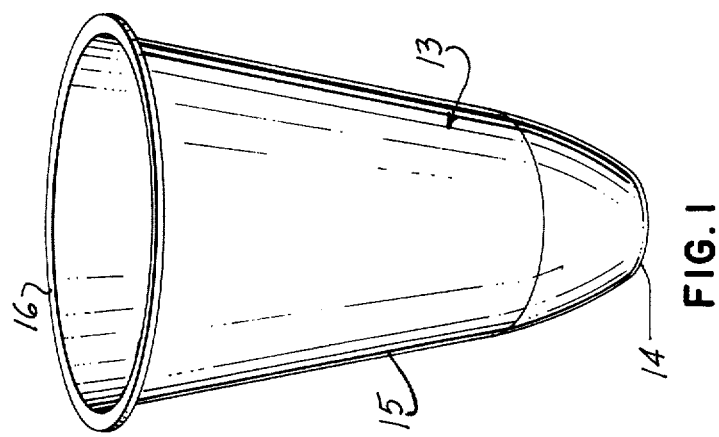
FIG. 1 is a perspective view of a preformed plastic article made or used in the processes and apparatus of the subject invention.

When the present invention is practiced using injection-blow molding equipment, an outer or female injection mold part is provided as shown in a fragmentary and cross-sectional view at 11. The male mold part 12 cooperates with the female mold 11 to define a mold cavity to mold the preform shown at 13 in FIG. 1. The female mold 11 may be constructed of one or more parts.

It should be understood that the preform 13 merely represents one form of a preformed article that is ideally produced by the process and apparatus of the invention. The preform 13 is a good example, because it represents an article which is considerably deeper than wide and further represents a type of article that is commonly molded with a relatively thin wall. The preform 13 is generally frusto-conical in shape and has a bottom wall 14 with an upwardly diverging side wall 15 which terminates in a rim 16 at the open upper end of the preform.

The injection mold parts 11 and 12 cooperate along a plane, such as may be defined by the line 17 in FIG. 2, to define a cavity 18 therebetween. The center lower end of the female mold 11 is provided with an injection nozzle 19 for delivering a molten thermoplastic material under relatively high pressures to the mold cavity 18.

The male mole part 12 is provided with a pin 20 which extends axially of the nozzle 19 and closely adjacent thereto. The mold part 12 in the present embodiment is further provided with a depending somewhat annular and tapered lower wall section 21 which encircles the pin 20. The tapering wall section 21 is not essential to the present invention and the wall section 21 may have any other desired shape.

The female mold 11 is provided with an annular wall section 22 which must encircle at least a portion of the pin 20. The annular wall section 22 further encircles the injection nozzle 19.

It may be seen in FIG. 3 that when the molten thermoplastic material under pressure is injected through the nozzle 19 into the space about the pin 20 and within the annular wall section 22, the molten plastic will substantially immediately fill the relatively small annular space about the pin 20. This condition of overlap of the mold parts at the injection nozzle effectively locks or prevents the part 20 from radial deflection as the molten plastic is further injected through the other portions of the cavity. It should be noted that the other portions of the cavity 18 axially and radially disposed from the injection nozzle 19 may not and need not be uniformly filled. The injection molding arrangement of the present invention will provide accurately controlled wall thicknesses in a molded article unless the mold design for the article is so unbalanced radially of the injection nozzle that radial deflecting forces are created which are in excess of the locking force of the molten plastic, the pin 20 and the annular wall section 22.

The next step of the process of the present invention is dependent upon whether injection-blow molding techniques are to be used or whether the preform 13 is to be cooled and removed from the male mold 12 for later use in blow molding equipment. If injection molding techniques are used the male mold 12 with the preform 13 thereon is removed from the female mold 11 and inserted into a female blow mold 30 such as shown in fragmentary cross section in FIG. 4.

Figure 4:
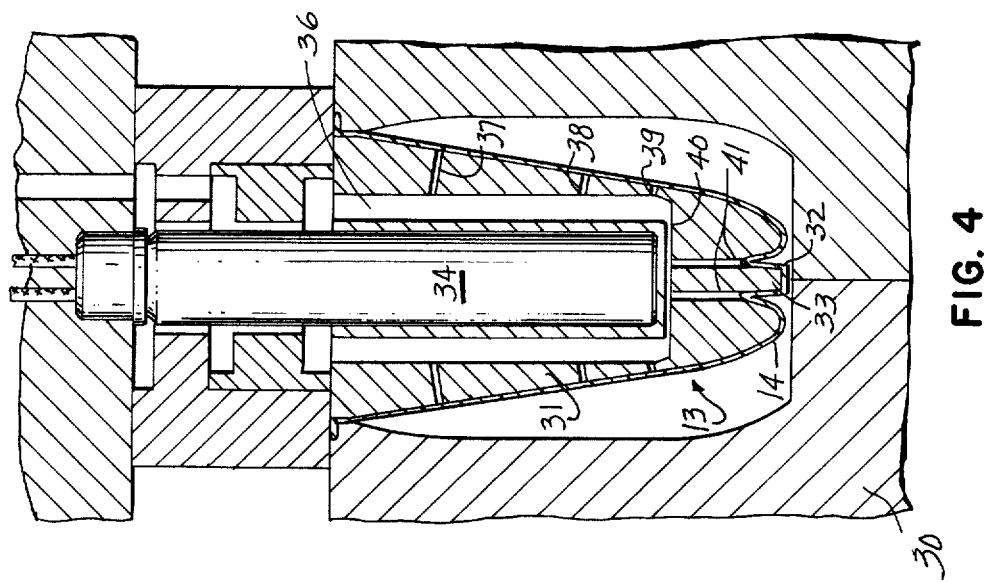
FIG. 4 is a cross-sectional view of blow molding apparatus made according to the process and apparatus of the present invention.

If the preform 13 is cooled and removed from the male mold 12 for later use in blow molding equipment, the preform 13 is applied by any means known in the art to a mandrel 31 as shown in FIG. 4. The mandrel 31 is formed to have substantially the same external shape as that of the male mold 12. This shape must include a depending pin 32 or its equivalent which is received within the recess 33 in the bottom wall 14 of the preform.

The important difference in the hereinafter described process and apparatus between injection-blow molding techniques and blow molding equipment using a preform 13 is the heating means for the preform 13. In injection-blow molding techniques the preform 13 on the male mold 12 is transferred to the female blow mold 30 while the preform 13 is still in a sufficiently heated condition for blow molding. In a blow molding arrangement the preform 13 is applied to the mandrel 31 and, generally, the mandrel includes an electrical heater such as shown at 34 for heating the preform 13 prior to insertion of the mandrel 31 and preform 13 into the female blow mold 30.

Figure 7:
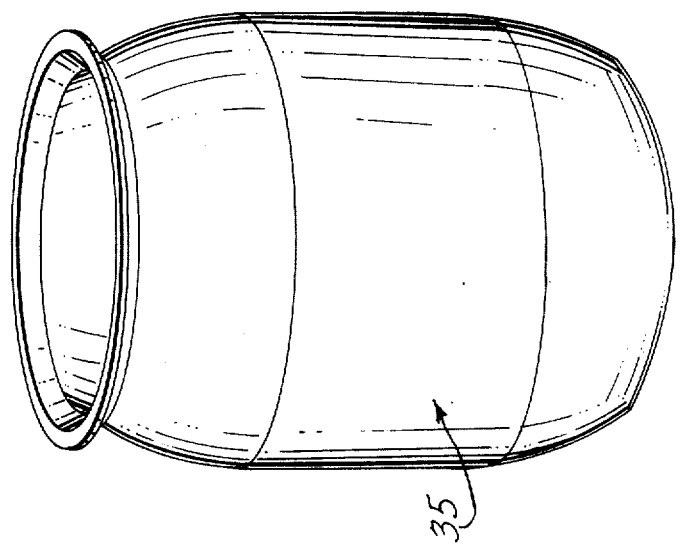
FIG. 7 is a perspective view of a reformed plastic article such as may be made using the process and apparatus of the present invention.

The female blow mold 30 is provided with an inner configuration of the desired shape of the finished article. The male mold 12 or the mandrel 31 with the preform 13 thereon must cooperate with the female blow mold 30 so that the pin 20 of the male mold 12 or the pin 32 of the mandrel 31 or their equivalents are positioned spaced from but closely adjacent to interior surface of the female blow mold 30. In the present embodiment the female blow mold 30 is provided with an internal shape to produce the non-nestable container 35 shown in FIG. 7. Thus, it may be seen that in the present embodiment the pin 20 of the male mold 12 or the pin 32 of the mandrel 31 is positioned spaced from but closely adjacent to the bottom wall of the female mold 30 which corresponds to the bottom wall of the blown container 35.

Figure 5:
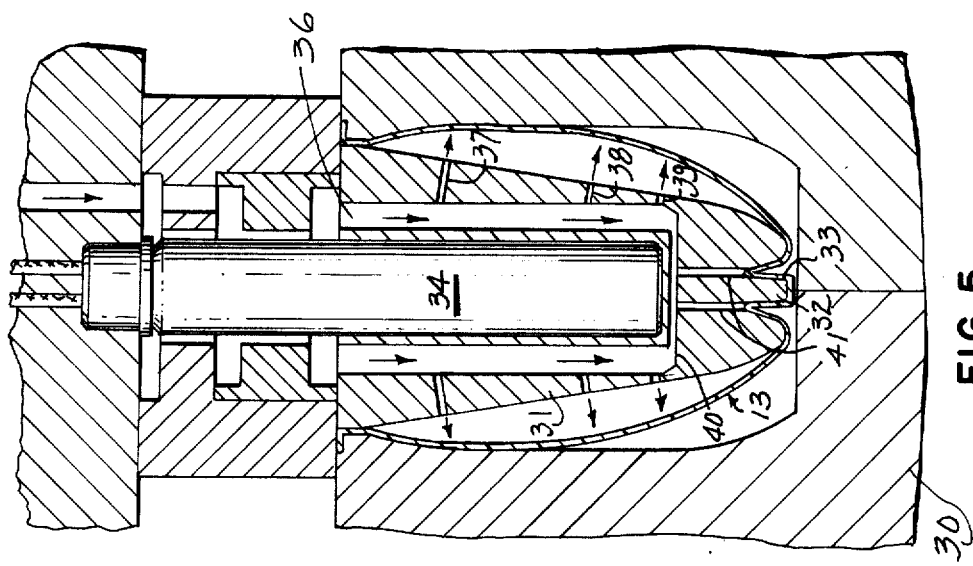
FIG. 5 is a view similar to FIG. 4, but showing the plastic article partially blown.
Figure 6:
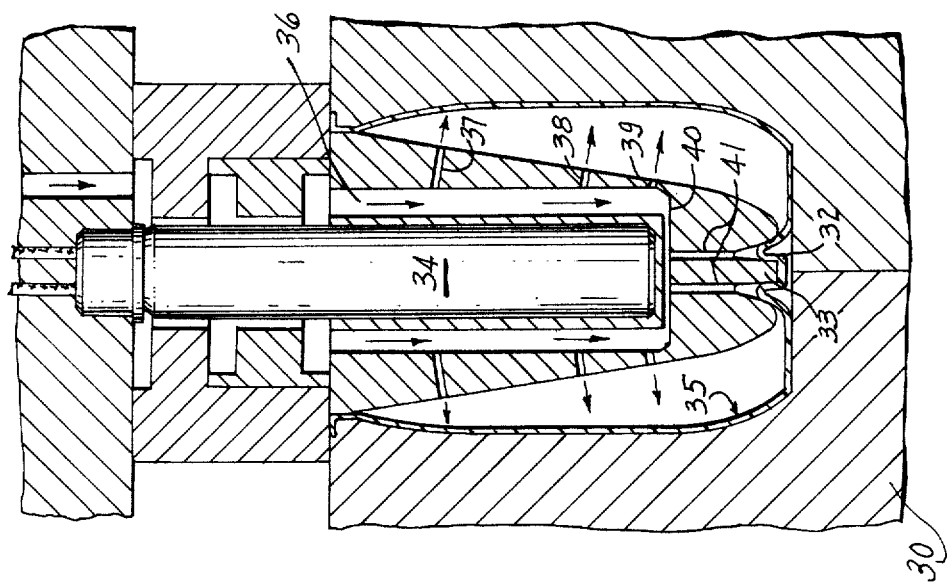
FIG. 6 is a view similar to FIGS. 4 and 5 but showing the plastic article in a substantially completely reformed configuration.

In blow molding the article 35, differential air pressure is applied between the interior and exterior of the preform 13. This may be accomplished by applying a vacuum through the walls of the female blow mold 30 to the cavity or by applying air under pressure to the interior of the preform 13 through the male mold 12 of the mandrel 31. FIGS. 4, 5 and 6 show one known system for applying air under pressure through the mandrel 31 to the interior of the preform 13. A plurality of air passageways such as 36 are formed in the mandrel 31 circumferentially about the heater 34. Further air passageways 37, 38, 39 and 40 are formed in the mandrel 31 and extend from each passageway 36 to the outer surface of the mandrel 31. The air passageways 41 extend from the outer surface of the mandrel 31 to the cavity in the mandrel 31 which carries the heater 34. The mandrel cavity opens into the passageways 36. FIG. 5 shows a partially blown container 35 and it should be noted that because of the arrangement of the pin 32 and the annular recess 33 within the preform 13, the preform 13 is prevented from slipping about the surface of the mandrel 31, and as the container is blown the upper portions of the side walls are first to engage the walls of the female mold 30 with the expansion or flow of material progressing downwardly until the closed end or bottom of the blown container is formed by the unfolding and spreading of the substantially annular bottom wall sections of the preform 13. With the preform 13 locked onto the mandrel 31 as described, the side and bottom walls of the container 35 will be uniformly and properly blown to the desired shape of the container 35 as shown in FIG. 6. The wall thickness of the finished container 35 will be accurately controlled.

Having described the invention, it is to be understood that changes can be made in the described embodiments by one skilled in the art within the spirit and scope of the invention as defined in the claims.

I claim:

1. The method for producing elongated relatively thin walled hollow thermoplastic articles with controlled wall thicknesses in an injection-blow molding arrangement, wherein the male injection mold part is retained at one end against axial movement within and relative to the female injection mold part to define a mold cavity and wherein the other end of said male injection mold part is capable of being deflected in a radial direction and wherein the injection molded preform is susceptible to shifting on said male mold part in blowing said article in a female blow mold having the shape of said article comprising the steps of:

directing a stream of a molten thermoplastic material into the injection mold cavity through the female injection mold part toward said other end of said male injection mold part and along the axis from which the male injection mold part is deflectable, thereafter directing said stream consecutively through restricted circumferentially continuous concentric annular areas encircling the entrance of said stream of molten thermoplastic material into said cavity and maintaining said axially fixed relation of said male injection mold part while continuing the foregoing flow of molten thermoplastic material through said concentric annular areas to fill said cavity to form the injection molded preform with circumferentially continuous concentric annular portions at said other end, moving said male injection mold part with said preform thereon into a female blow mold with said other end of said male injection mold part spaced from and sufficiently adjacent to one interior surface of said female blow mold to mechanically lock said circumferentially continous concentric annular portion of said preform on said male injection mold part during initial blowing, applying blowing air through the sides and said other end of said male mold part to blow the sides of said preform against the interior surface of said female blow mold during initial blowing and to thereafter blow said other end of said injection molded preform into the shape of said article 2. In the method as defined in claim 1, wherein the hollow plastic article is a container with an open upper end, and wherein said directing a stream of molten thermoplastic material into the injection mold cavity is in a direction along the longitudinal center axis of the container defined by the cavity and at the bottom thereof.

3. The method for producing relatively thin walled hollow thermoplastic articles with controlled wall thicknesses in a blow molding arrangement using a molded preform which is susceptible to shifting on the male mandrel in blowing said preform in a female blow mold having the shape of said article comprising the steps of:

forming said preform with a central wall portion indented inwardly to form a projection extending from one interior wall of said preform which is substantially less in diameter than the remaining wall portions of said preform, providing said mandrel with the shape of the interior of said preform and including a recess in the mandrel having a shape complementary to the shape of said projection and further providing air blowing passageways through the mandrel to the outer surface thereof and including the surface of said recess, applying said preform onto said mandrel with said projection of said preform disposed within said recess in said mandrel, heating said preform to a suitable condition for blowing, inserting said mandrel with said preform thereon into a female blow mold with the wall of said preform having said projection spaced from and sufficiently adjacent to one interior surface of said female blow mold to mechanically lock said continuous annular portion of said preform within said continuous annular recess in said mandrel during initial blowing, and applying blowing air through said passageways to blow said remaining wall portions of said preform against the interior surface of said female blow mold during initial blowing and to thereafter blow said projection of said preform against the interior surface of said female blow mold.

4. In the method as defined in claim 3, wherein said hollow thermoplastic articles are containers having open upper ends, and wherein said forming said preform with a central wall portion indented inwardly to form a projection is a forming of said preform with a side wall tapered from an open upper end to a bottom wall with said projection being defined in the central portion of said bottom wall of said preform.

* * * * *